April 22, 1958 G. D. HENDRICKS 2,832,071

APPARATUS FOR THE PROGRAMMED TRANSMISSION OF CODED SIGNALS OVER SELECTED WIRES

Filed Jan. 14, 1955 2 Sheets-Sheet 1

INVENTOR.
G. DONALD HENDRICKS
BY Bruno C. Lechler
attorney

INVENTOR.
G. DONALD HENDRICKS
BY attorney

United States Patent Office
2,832,071
Patented Apr. 22, 1958

2,832,071

APPARATUS FOR THE PROGRAMMED TRANSMISSION OF CODED SIGNALS OVER SELECTED WIRES

George Donald Hendricks, Campbells Island, Ill., assignor to Eagle Signal Corporation, Moline, Ill., a corporation of Massachusetts Application January 14, 1955, Serial No. 481,891

4 Claims. (Cl. 340—357)

The invention relates to apparatus that will, at the proper time, select one of a number of local circuits and send over that circuit a selected message.

The apparatus will normally at one time select one of a number of local circuits and send a message applicable to that circuit—and the message may be a continuous current—and then, at some other set time, similarly choose another local circuit and send a message applicable to that circuit over it. The timed actuation of selected circuits thus forms a program that can be varied by manual or other means. In a common form of apparatus, after the program is set up, it repeats itself until another program is set up.

These programs may extend over long periods such as a day or a week. The apparatus includes a device that at short intervals, such as one minute, changes the position of elements that indicate at any instant the particular day, hour and minute. When the particular minute that corresponds to the selected time for placing current on a circuit arrives these elements permit an apparatus that is adapted to actuate switches to function.

These devices are designed to place at the selected times current on any one of not more than six wires which will be referred to as primary circuits.

The invention provides an apparatus that can actuate a program which includes more than six local circuits while still using an already available device developed for six primary circuits. This is accomplished by using one of the primary circuits leading from the existing device to control the position of a multiple switch that connects each one of the remaining primary circuits leading from the device to one of several local circuits.

Thus, if the existing device which is used has six outgoing primary circuits and one of these is used to control the position of a multiple switch, the remaining 5 primary circuits connected to ten, fifteen or more, local circuits.

Thus it will be seen that the invention permits the expansion of the scope of existing devices intended to program only 6 circuits to ten or more local circuits.

In the simplest form of the invention the coded signals consist of only one current pulse—that is current flows over the local circuit for just one interval which may be long or short. Each local circuit may lead directly to a device whise operation it controls.

In a modified form of the invention a signal indicative of the particular local circuit that has been actuated is transmitted over each local circuit. Each signal may consist of a number of pulses and the signals may differ either in the number of pulses, the length of the pulses, or the spacing of the pulses.

Since each local circuit transmits its own distinctive signal in this form of the invention, all the signals may be sent over a single channel leading to a distant location. At the distant location means are provided to actuate a particular device in response to a particular coded signal received over the single channel.

By way of illustration, but not by way of limitation, the invention will be described as the apparatus is used in connection with traffic control systems. Such systems include a central station from which a large number of local controllers of traffic signals may be synchronized and changed in their pattern of operation. Each local controller may be adapted to shift red, amber, and green lights at a street intersection to control traffic according to one of a number of patterns. There are usually three traffic patterns, a choice of three total lengths of each pattern. There may also be a shutdown to take the lights out of operation, a flashing night light for use when traffic is light, a no-left turn arrow, and other functions. This example would call for more than six lines leading from the central station to each local controller. In this example the programming apparatus that is to automatically shift the local controller from one kind of operation to another during the various hours of each day of a whole week must control at least nine local circuits.

It will also be understood that when existing central stations were installed they may have been equipped with a programming device designed for the control of the six basic functions. As the traffic systems are improved, such features as the flashing night light are added.

The invention provides means in which the existing programming device may be supplemented to provide an apparatus that will control ten or more local circuits.

The object of the invention is to send a signal at a preset time over a selected one of a large number of local circuits by using a time-responsive device designed for a small number of primary circuits and connecting one of those primary circuits to a particular one of a plurality of local circuits any one of which can be connected to that primary circuit.

Another object of the invention is to enable a time-responsive device designed to close one of a small number of circuits to serve a large number of local circuits by using one of the small number of circuits to position a multiple switch to connect each of the other ones of the small number of circuits to one of several local circuits.

Another object of the invention is to enable a time-responsive device designed for a small number of circuits to serve a large number of local circuits and to send a coded message over any one local circuit at a preset time.

Another object of the invention is to enable an apparatus designed to energize a few local circuits at predetermined times to send over a single channel a larger number of distinctive signals at predetermined times.

Figures 1, 2, 3:
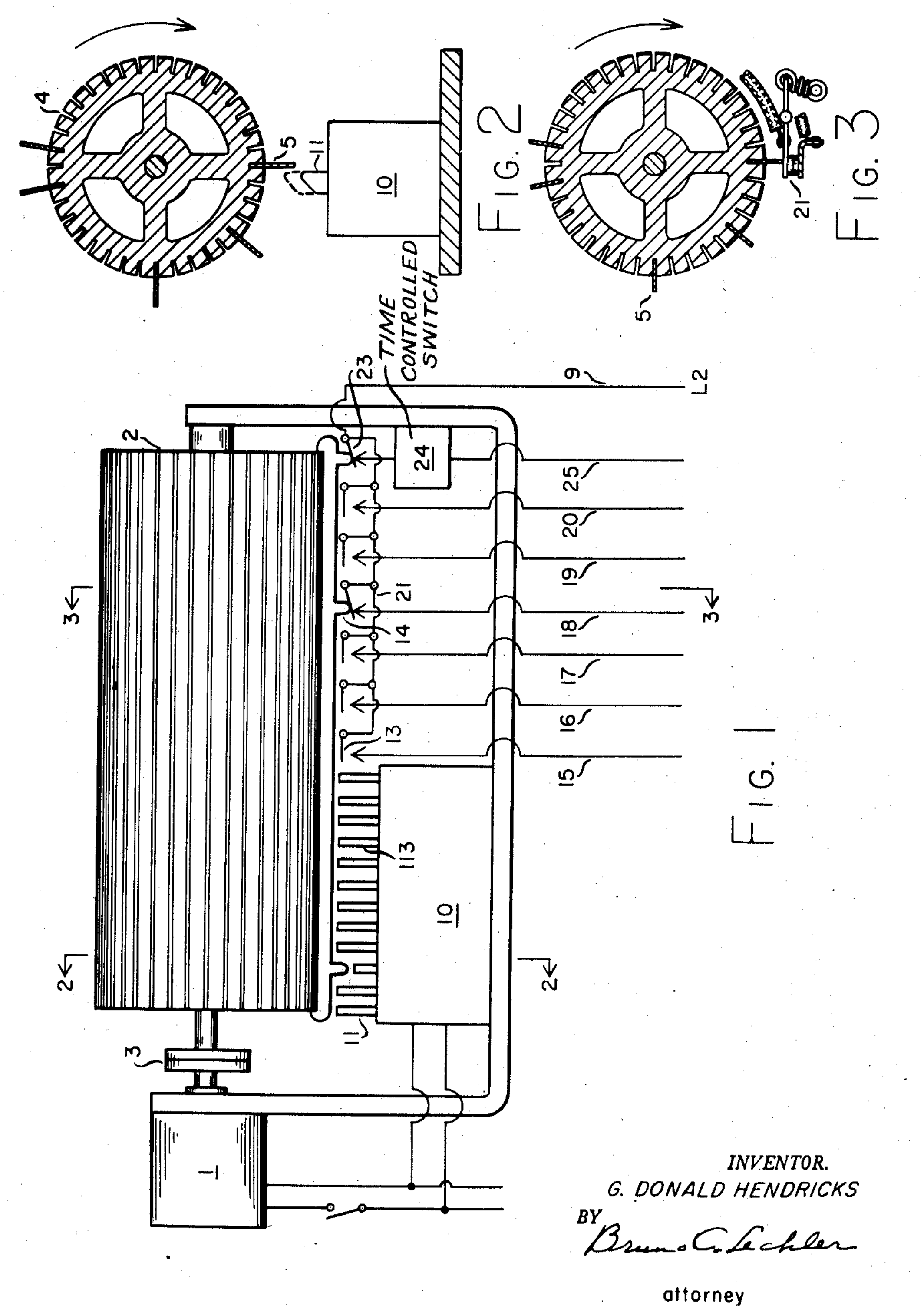
Figure 1 shows, in diagrammatic elevation, that portion of the apparatus that is common to the several forms of the invention.
Figure 2 shows in section along lines 2—2 in Figure 1 an end elevation of the apparatus shown in Figure 1.
Figure 3 shows a section along lines 3—3 in Figure 1.

That portion of the invention that is common to all of the forms of the invention is shown in Figures 1, 2, and 3. This portion of the invention may take several forms since, in part, it comprises existing units. In the form here shown, 1 indicates in a general way a motor providing continuous torque. It is shown as a motor running continuously and connected to a rotatable drum 2 by a friction clutch 3. This drum has a number of slots 4. Each of these slots is adapted to carry a timing bar 5 of the type shown in Figure 7. Each of these timing bars has three sections 6, 7, 8, each carrying one or more fingers whose function will be described later.

Below that portion of the drum 2 occupied by the portions 6 of the various timing bars 5 is a timing device, generally shown at 10. This timing device is clock driven and has a series of vertical stops 11 that are successively drawn down and then allowed to rise to their original position. A fixed time interval, such as a minute or five minutes, elapses between the movement of one stop and the movement of the next stop.

The drawings show only a limited number of stops operated in succession. The number of stops may be larger and they may be operated in various combinations to give a larger number of different stop positions occurring at equal time intervals.

This timing device need not be described since such devices are well known. By way of illustration reference is made to the timing device forming a part of the International Business Machine Timer 803 described in their publication, Form 23-5246-0.

In timers of this type the section 6 of each timing bar has at least one finger 12. This finger may be in any one of a number of positions, but in each position it is aligned with one of the stops 11.

It will be obvious that the motor 1 will rotate the drum until the finger 12 on one of the timing bars 5 engages one of the stops 11. As the timing apparatus draws one stop 11 down and then restores it, it is obvious that the drum cannot move until that particular stop against which the finger 12 is bearing is withdrawn. Then the drum will turn until the next timing bar whose finger 12 is in a different position bears against another stop 11. Thus the function of the timing apparatus is solely to determine the number of time intervals that must elapse after the drum has brought one timing bar into operating position until the next bar is brought into operating position.

Whenever the drawing down of the proper stop 11 disengages finger 12 and the drum rotates, a particular local circuit that has been preselected receives current.

The preselection results from the position in which the finger 14 in section 7 of the next timing bar 5 that will engage a stop has been placed. While only one finger 14 is shown, there can be several fingers 14 on a timing bar.

The next bar to engage one of the stops 11 is that particular bar whose finger 12 is not designed to engage that stop 11 that has been withdrawn. Normally, though not necessarily, it is the bar in the next slot of the cylinder.

A number of primary circuits, six in the drawing, 15–20 are connected respectively to switches 13. Which one of these switches is closed by the finger 14, is determined by the position of the finger 14 on timing bar 5. Each switch 13 is connected to a line 21 connected through line 9 to a current source L2.

The timing bar 5 has a third section 8 which normally carries a finger 22 to close a switch 23. When closed, switch 23 may supply current from line 9 to a time controlled switch 24 that feeds current to a line 25 for a fixed time interval every time switch 23 is closed and then cuts off the current flow.

Thus, the time controlled switch may supply current to line 25 for 30 seconds only after the switch 23 closes. Such time controlled switches being well known, the operation of time switch 24 need not be described in detail.

The apparatus thus far described may be used to place current on primary circuits 15 to 20 and line 25 at desired times in the following manner.

A number of timing bars 5 having their fingers 12, 14 in different positions, and some having a finger 22 while others do not, are provided.

These are placed in slots 4 in the drum 2.

Depending on the positions of the fingers, the drum will rotate until the finger 12 on one bar engages one of the stops 11. The drum will remain in that position until enough time intervals have elapsed to reach the point in the pattern of movement of the stops 11 when that finger 12 is released.

The next bar 5 is now brought into position by the rotation of the drum where its finger 12 engages some other stop 11. Again there is a pause until such time as that particular stop is moved.

Thus the drum may, by step-by-step movement, go through a complete cycle, and this cycle may be repeated.

Each time the drum moves, the finger 14 on another bar 5 will close one of the switches 13 controlling the primary circuits 15–19. If there is a second finger 14, an extra switch 13 supplies current to circuit 20 that actuates multiple relay 27.

Figure 4:
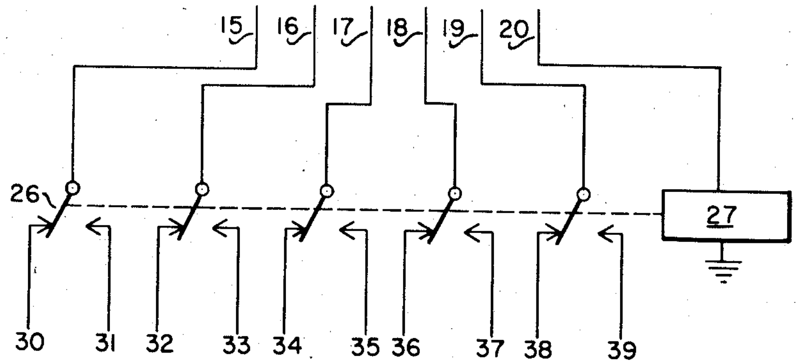
Figure 4 shows that portion of the apparatus comprising the basic form of the invention that is now shown in Figures 1, 2, 3.
Figure 7:
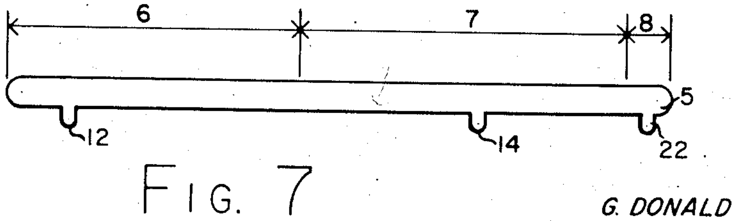
Figure 7 shows a timing bar.

In one form of the invention shown in Figures 1, 4, 7, each bar 5 has, in addition to fingers 12 and 14, a finger 22 which closes a switch 23 that places current on line 25 for a period whose length is determined by a time controlled switch 24.

Obviously there is a limit to the number of primary circuits 15–20 on which current can be placed at desired intervals of time. In many applications of apparatus of this general type of apparatus, 6 primary circuits 15 to 20 meet all needs. The invention provides means whereby this apparatus, designed to control only 6 primary circuits may serve some larger number of local circuits—ten in the form of the invention shown in Figure 4.

In this form of the invention, each of the primary circuits 15 to 19 leads to a different movable contact 26 of a sequence relay 27 to which wire 20 leads.

Each time the sequence relay is actuated it moves all of the movable contacts 26 to their opposite position.

Thus the primary circuits 15–19, with the movable contacts in the position shown, will, as current is placed on each primary circuit, place current on local circuits 30, 32, 34, 36, 38. But if a timing bar 5 has two fingers 14, one of which places current on primary circuit 20, then the sequence relay 27 transfers the movable contacts 26 to their alternate position and the other finger 14, placing current, on one of the primary circuits 15–19 will place current on one of the local circuits 31, 33, 35, 37, 39.

Thus the invention provides means whereby the apparatus shown in Figures 1–3, designed to select one of six primary circuits, can serve ten local circuits.

Figure 6:
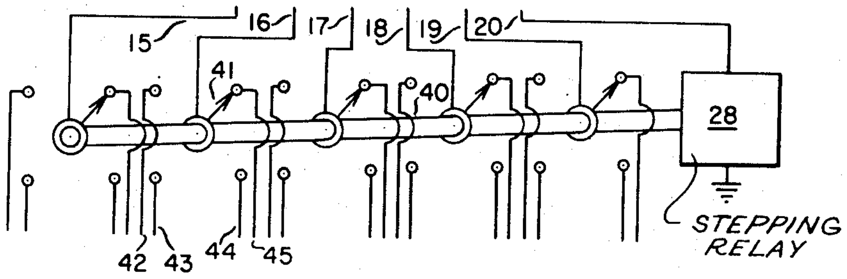
Figure 6 shows a substitute for the apparatus shown in Figure 4 which may be combined with the apparatus shown either in Figures 1, 2, 3, or in Figures 1, 2, 3, 5 to for still another form of the invention, a form serving a still larger number of local circuits.

The invention is not limited to increasing from six to ten the scope of apparatus designed to select at proper time intervals one of several circuits. Figure 6 shows an apparatus which more than doubles the number of circuits served.

In this form of the invention a ratchet type stepping relay 28 steps a shaft 40 to its next position each time a finger 14 places current on primary circuit 20. Thus the switch arm 41 connected to one primary circuit 16 may contact 4 local circuits 42–45.

In this manner each of the five primary channels 15–19 may serve 4 local circuits—a total of 20 circuits.

In another form of the invention the timing device designed only to place current on a selected one of six primary circuits, not only serves a larger number of local circuits but sends a coded message, peculiar to each of these local circuits, at a selected time.

Figure 5:
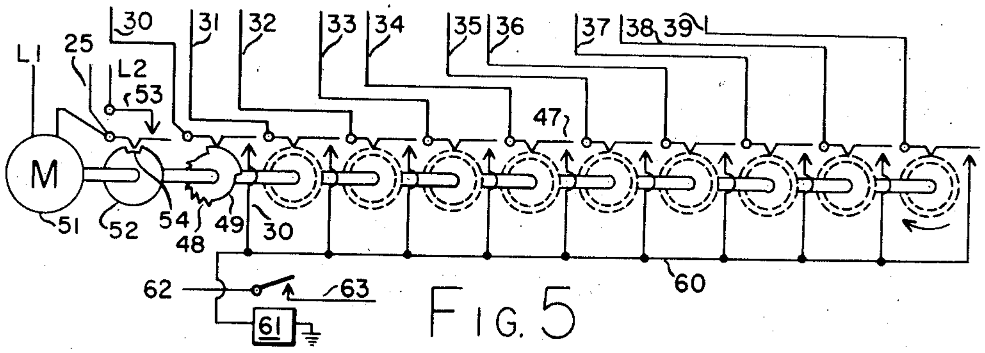
Figure 5 shows apparatus which, added to the basic form of the invention shown in Figures 1, 2, 3, forms a modified form of the invention.

Referring to Figures 4 and 5, each of the primary circuits 15 to 19 is connected to one of the local circuits 31–39 shown in Figures 4 and 5 by the sequence relay 27.

Each of these local channels contains a normally open switch 47.

Each local switch is actuated by a circular cam 48 having depressions 49 of various lengths. It will be obvious that if the apparatus shown in Figures 1, 2, 3, 4 places current on line 30, and this cam is turned through a full revolution, a series of signals of varying lengths interspersed by pauses of various lengths will be sent. All the cams may be mounted on the same shaft 50. This shaft is turned through one revolution by an electrically driven unit 51. Even though at each revolution all the cams revolve, each actuating its switch, only that one of the lines 30–39 that is placed by the sequence relay 27 and one of the switches 13 in connection with the power source connected to line 9 will actually be able to transmit a signal.

The unit 51 may include a synchronous motor that is connected to line 25 which is energized momentarily by time switch 24 when the drum moves forward. This will start the shaft 50 turning, and after the shaft has made a partial revolution the cam 52 will close the switch 53 supplying current from a power source to unit 51. When this unit has completed a revolution the switch 53 will be opened by the notch 54 in the cam 52.

Each of the local channels 30 to 39 in Figure 5 may terminate in a common line 60 that leads to a relay 61. Thus, as the particular cam 48 that actuates the switch 47 in the particular one of the local channels 30 to 39 that carries current at a given time, pulses whose length, number, and spacing is determined by the recesses 49 of that cam will be sent over line 60 to relay 61.

Relay 61 controls the flow of current from an L2 source over line 62 to a distant location over a single channel 63. The single channel will transmit, over wire or radio to the distant location, the identical coded message received from one of the local circuits 30–39.

I claim:

1. An apparatus for placing current on a particular secondary circuit at a particular time comprising, in combination, a timing device having a plurality of spaced stops each of which is withdrawn at a preset time, a plurality of bars each having a timing finger adapted to engage a particular stop, a cylinder having slots in which said bars rest, means adapted to turn said cylinder when a particular stop is withdrawn until another finger engages one of said stops, a plurality of switches spaced along said cylinder, a primary circuit leading from each of said switches, at least one primary circuit switch closing finger on each bar, a third finger on at least one of said bars, an extra switch actuated by said third finger to supply current to a multiple switch relay, a plurality of secondary circuits a different one of which is connected to each primary circuit for each position of the multiple switch whereby current is placed only on the particular secondary circuit connected by the multiple switch to a primary circuit activated by the primary circuit closing switch.

2. An apparatus for placing current on a particular secondary circuit at a particular time comprising, in combination, a timing device having a plurality of spaced stops each of which is withdrawn at a preset time, a plurality of bars each having a timing finger adapted to engage a particular stop, a cylinder having slots in which said bars rest, means adapted to turn said cylinder when a particular stop is withdrawn until another finger engages one of said stops, a plurality of switches spaced along said cylinder, a primary circuit leading from each of said switches, at least one primary circuit switch closing finger on each bar, a third finger on at least one of said bars, an extra switch actuated by said third finger to supply current to a multiple switch relay, a plurality of secondary circuits a different one of which is connected to each primary circuit for each position of the multiple switch whereby current is placed only on the particular secondary circuit connected by the multiple switch to a primary circuit activated by the primary circuit closing switch, a coding device including a number of cams each actuating a coding switch connected to one of said secondary circuits, means to turn each cam through a full revolution, a code initiating finger on said bars, a switch closed by said code initiating finger feeding current to the means initiating the rotation of said cams.

3. Apparatus for placing current on a particular secondary circuit at a preset time, comprising, in combination, a slotted cylinder, means tending to rotate cylinder in one direction, bars carried in the slots of said cylinder which have a plurality of fingers, time actuated stops one of which is engaged by one finger on one of said bars to stop the rotation of said cylinder and to place a second finger of said bar in operative position, a plurality of switches one of which is engaged by said second finger and then places current on a primary circuit, means actuated by a third finger on said bar to connect each primary circuit to a particular one of a plurality of secondary circuits.

4. Apparatus for placing current on a particular secondary circuit at a preset time, comprising in combination, a slotted cylinder, means tending to rotate said cylinder in one direction, bars carried in the slots of said cylinder which have a plurality of fingers, time actuated stops one of which is engaged by one finger on one of said bars to stop the rotation of said cylinder and to place a second finger of said bar in operative position, a plurality of switches one of which is engaged by said second finger and then places current on a primary circuit, means actuated by a third finger on said bar to connect each primary circuit to a particular one of a plurality of secondary circuits, means controlled by still another finger on said bar to actuate a plurality of coding means each connected to one secondary circuit so that only that coding means connected to the selected secondary circuit will transmit a coded message.

References Cited in the file of this patent

UNITED STATES PATENTS

| | | |
|---|---|---|
| 1,144,870 | Sohm | June 29, 1915 |
| 1,977,953 | Olson | Oct. 23, 1934 |
| 2,456,893 | Roth | Dec. 21, 1948 |
| 2,589,014 | Frantz | Jan. 23, 1951 |

U. S. DEPARTMENT OF COMMERCE

PATENT OFFICE

CERTIFICATE OF CORRECTION

Patent No. 2,832,071 George Donald Hendricks April 22, 1958

It is hereby certified that error appears in the printed specification of the above numbered patent requiring correction and that the said Letters Patent should read as corrected below.

Column 1, line 59, for "whise" read -- whose --; column 2, line 64, for "for" read -- form --; column 6, line 22, before "cylinder", second occurrence, insert -- said --; column 6, line 57, list of references cited, for the number of the Frantz reference read -- 2,539,014 --.

Signed and sealed this 24th day of June 1958.

(SEAL)
Attest:

KARL H. AXLINE
Attesting Officer

ROBERT C. WATSON
Commissioner of Patents